United States Patent [19]

Nüsse

[11] Patent Number: 4,503,463
[45] Date of Patent: Mar. 5, 1985

[54] IMAGE REPRODUCING APPARATUS

[75] Inventor: Theo Nüsse, Willebadessen, Fed. Rep. of Germany

[73] Assignee: Nixdorf Computer AG, Fed. Rep. of Germany

[21] Appl. No.: 430,170

[22] Filed: Sep. 30, 1982

[30] Foreign Application Priority Data

Jul. 26, 1982 [DE] Fed. Rep. of Germany ....... 3227850

[51] Int. Cl.³ .......................... H04N 5/04; H04N 5/64
[52] U.S. Cl. ..................................... 358/148; 358/254; 318/329
[58] Field of Search ............... 358/148, 188, 242, 254; 318/329

[56] References Cited

U.S. PATENT DOCUMENTS 2,897,487 7/1959 Owen .................................. 358/254
3,399,334 8/1968 MacLeod ............................ 318/329

Primary Examiner—Howard W. Britton
Assistant Examiner—John K. Peng
Attorney, Agent, or Firm—Krass & Young

[57] ABSTRACT

In an image reproducing apparatus with electromagnetic beam deflection of the picture tube (10) occurring as a function of an image synchronizing signal (BSN) and with a blower (20), the motor (18) of the latter is designed as a phase-shifting asynchronous motor to avoid image interferences due to magnetic leakage fluxes, in which motor the current supply takes place in a bridge circuit (50) controlled as a function of the image synchronizing signal (BSN) in such a way that the rotary field of the motor (18) is synchronous to the image synchronizing signal (BSN).

18 Claims, 1 Drawing Figure

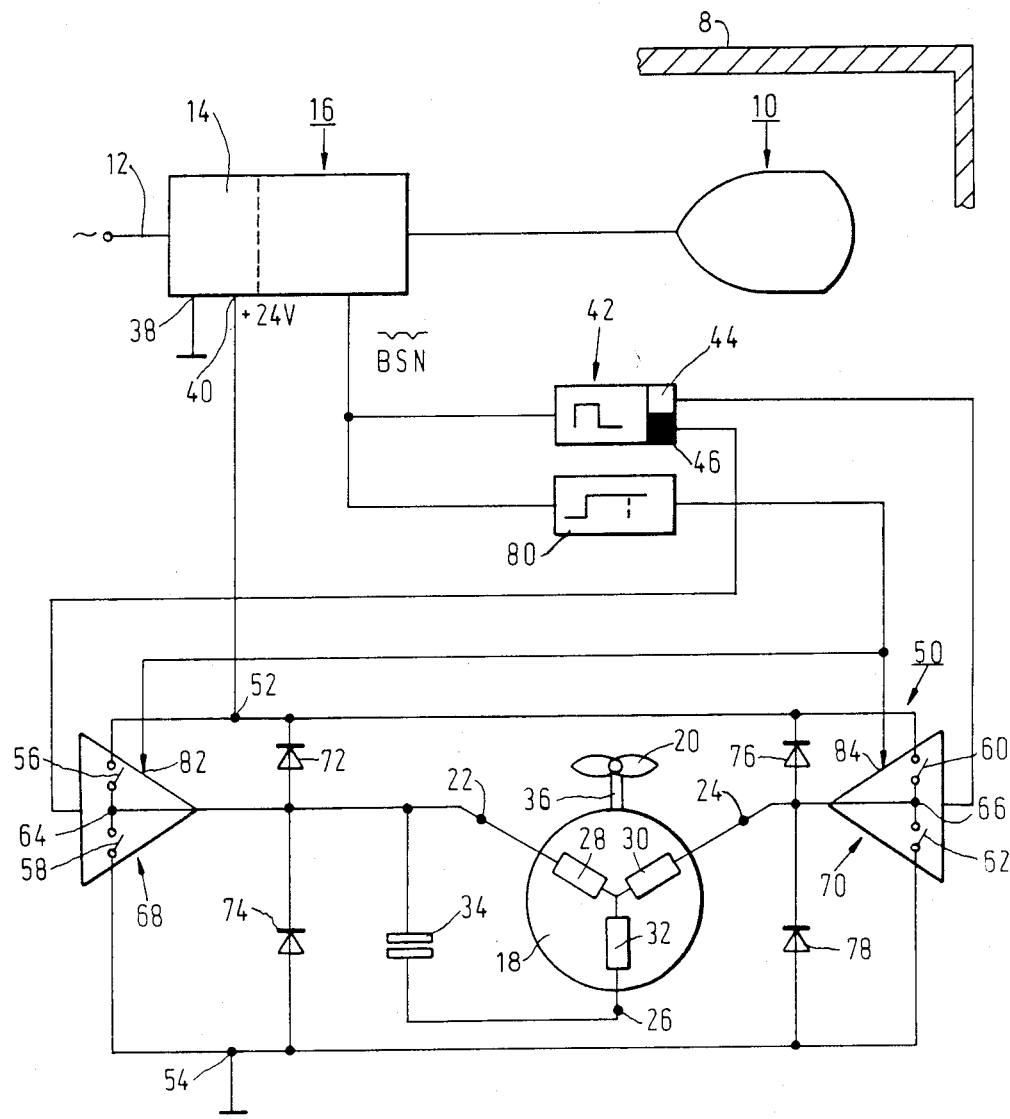

IMAGE REPRODUCING APPARATUS

INTRODUCTION

The invention relates to an image reproducing apparatus and more particularly to a CRT-type image reproducing apparatus in which the image sync signal is synchronized with the field of a ventilator motor to avoid image distortion from stray motor fields.

BACKGROUND OF THE INVENTION

In a known CRT-type image reproducing apparatus of this type the blower provided for ventilating the housing is driven by a split-pole motor supplied by the ac power line. Such a split-pole motor generates a relatively strong stray magnetic field which can affect the beam deflection of the picture tube, so that the image distortions arise. Such distortions occur especially when the image reproduction frequency of the picture tube coincides with the nominal line frequency and the power line frequency fluctuates, as can be the case in island power lines or private lines. That is, the image reproduction frequency is generated by the repetition frequency of the image synchronizing pulses contained in the image synchronizing signal and is very precisely constant, since the image synchronizing signal is for example generated by a crystal-controlled pulse generator, so that frequency and phase deviations between the image synchronizing signal and the line voltage occur. These deviations lead to a shaking of the image. Screening off the magnetic field of a split-pole motor would be possible only with a disproportionately large and complex structure. Replacing the split-pole motor with an ac motor of a different design cannot eliminate the above-mentioned disadvantages, and even further increases the construction complexity. Replacing the split-pole motor by a dc commutator motor is likewise out of the question, since the latter generates strong electromagnetic interference fields.

SUMMARY OF THE INVENTION

The invention is based on the problem of developing an image reproducing apparatus with a low construction complexity on the basis of eliminating image interference caused by the motor of the ventilator.

By synchronizing the rotary field of the motor with the image synchronizing signal and therewith with the image reproduction of the picture tube, the result achieved is that a stray field generated by the motor no longer shows any deviations in frequency and phase from the image reproducing frequency, so that the effect on the beam deflection of the picture tube remains constant. In this way image interference is eliminated. Fairly permanent constant effects on the beam deflection in the image reproduction can be compensated for completely by suitably adjusting its control circuit.

BRIEF DESCRIPTION OF THE DRAWING

The invention is explained in detail in the following on the basis of the drawing in which an image reproducing apparatus is shown with its mechanical parts largely omitted and partly in a block diagram representation.

DETAILED DESCRIPTION OF THE ILLUSTRATIVE EMBODIMENT

The image reproducing apparatus represented includes a CRT-type picture tube 10 with electromagnetic beam deflection, arranged in a housing 8, shown only representationally, a control circuit (16) supplied by an ac power line by way of an ac terminal 12 and containing a rectifier part 14, which circuit generates an image synchronizing signal BSN with an image reproducing frequency matching the nominal power line frequency but crystal-stablilized, and a blower 20 arranged in the housing and driven by an electric motor 18. The motor 18 is a rotary-field motor the rotary field of which, in a manner yet to be described, is continously generated synchronously to the image synchronizing signal BSN as a function of the latter.

In the embodiment example the motor 18 is a phase-shifting asychronous motor with three field coils 28, 30, 32 connected in a star circuit between the field coil terminals 22, 24, 26, wherein the field coil terminal 26 is connected with a single other field coil terminal, namely the field coil terminal 22, by way of a capacitor 34 causing a phase shift. It is advantageous for the motor 18 to have an external rotor, not represented in detail, with which the blower 20 is connected by way of a shaft 36. The outside rotor has the effect of magnetic screening, whereby stray magnetic fields are reduced.

The field coils 28, 30 of the motor 18 are supplied periodically and in pulses with a certain phase shift from a dc power source. For this purpose, a rectifier 14 is provided in the control circuit 16, which part rectifier delivers a dc voltage of 24 volts in the embodiment example between its output terminals 38, 40 for feeding the motor 18. The output terminal 38 is grounded.

For controlling the current supply to the field coils 28, 30 of the motor 18 it is advantageous to provide at least one pulse generator to which the image synchronizing signal BSN is applied, which generator, when an image synchronizing pulse occurs in the image synchronizing signal, generates respectively in the image synchronizing signal a first undelayed control pulse and a second control pulse which is delayed with respect to the occurrence of the image synchronizing pulse, as a function of which, suitable switching elements causing the current supply are controlled. The generation of the above-mentioned control pulses can be facilitated by having the first and the second control pulse each show a pulse duration equal to half the sequence duration of the image synchronizing pulse and having the second control pulse follow the first control pulse immediately in time. For this purpose in particular a single pulse generator 42 may be provided, which generator shows two nonequivalent outputs 44, 46 and which in the output signal of the one output 44 generates the first control pulse and in the output signal of the second output 46 generates the second control pulse. It is advantageous for this pulse generator to be designed as a monostable sweep element which is respectively swept when an image synchronizing pulse occurs in the image synchronizing signal BSN and is swept back after half the sequence duration of the image synchronizing pulse.

The supply circuit provided for the motor 18, which contains the switching elements controlled by the pulse generator 42 for the current supply, is a bridge circuit 50, the one supply bridge terminal 52 of which is connected with the positive terminal 40 of the rectifier part 14 and the other supply bridge terminal 54 of which is grounded to chassis. Four bridge arms are respectively formed by one switching element 56, 58, 60, 62 each. Between the switching elements 56, 58 which are connected in series between the supply bridge terminals 52, 54 there is a second bridge terminal 66. The field coil terminal 22 is connected with the bridge terminal 64, and the field coil terminal 24 of the motor 18 is connected with the bridge terminal 66.

The switching elements 56, 58 are transistors of a driving amplifier 68, the output of which is identical to the first bridge terminal 64 and the input of which is connected with the output 46 of the pulse generator 42 and thus has the respective second control pulse applied to it. In the presence of the second control pulse the switching element 56 is conducting and the switching element 58 is non-conducting, so that the field coil terminal 22 is connected to the positive dc voltage by way of the supply terminal 52. In the absence of the second control pulse, the switching element 56 is non-conducting and the switching element 58 is conducting, so that the field coil terminal 22 is grounded by way of the supply terminal 54. The switching elements 60, 62 are formed by transistors of another driving amplifier 70 similar to the driving amplifier 68 the output of which amplifier 70 is identical with the second bridge terminal 66 and the input of which is connected with the output 44 of the pulse generator 42 so that the first respective control pulse is applied to it. In the presence of the first control pulse the switching element 60 is conducting and the switching element 62 is non-conducting, so that the field coil terminal 24 is connected to the dc voltage by way of the supply terminal 52, while in the absence of the first control pulse the switching element 60 is non-conducting and the switching element 62 is conducting, so that the field coil terminal 24 is grounded. Because of the nonequivalence of the control pulses transmitted by the outputs 44, 46 of the pulse generator 42, during the first half of the sequence duration the switching elements 58, 60 are conducting and the switching elements 56, 62 non-conducting and during the second half of the sequence duration the switching elements 56, 62 are conducting and the switching elements 58, 60 are nonconducting, alternating respectively during the sequence duration of a pair of successive image synchronizing pulses of the image synchronizing signal BSN.

A diode 72, 74, 76, 78 reverse-biased with respect to the dc voltage of the rectifier part 14 is connected in parallel to each switching element 56, 58, 60, 62. Thereby the energy stored in the field coils 28, 30, 32 is periodically sent back to the rectifier part 14. Since a rotary-field motor in any case can operate with a more favorable efficiency than a split-pole motor, a considerably more favorable driving of the blower 20 as regards efficiency is obtained on the whole than with a conventional split-pole motor, even with allowance made for the losses in the rectifier part 14.

In order that upon any non-occurrence of the image synchronizing signal BSN, the field coils 28, 30 of the motor 18 do not have a direct current flowing through them, which would mean an unnecessary power leakage and might damage the motor 18, it is advantageous to provide that the current supply to the field coil terminals 22, 24 of the motor 18 be switchable as a function of the non-occurrence of any image snychronizing pulse in the image synchronizing signal BSN during a prescribed period exceeding the sequence duration of the image synchronizing pulse occurring in this signal in trouble-free operation. This is achieved in the embodiment example by having the image synchronizing signal BSN applied to a retriggerable monostable sweep element 80, upon the non-occurrence of the output signal of which the current supply is interrupted. With a trouble-free image synchronizing signal BSN the sweep element 80, which is swept or triggered at the start of each operation, is triggered anew with each image synchronizing pulse, so that it maintains its swept state continuously and generates a corresponding output signal. But if the image synchronizing pulses fail to occur, then the sweep element 80 sweeps back after the duration of its sweep period which is somewhat greater than the sequence duration of the image synchronizing pulses, so that its output signal fails to occur. Allowance is made for the output signal of the sweep element 80, which is applied with this to the clear inputs 82, 84 provided on the driving amplifiers 68, 70. Only when the output signal of the sweep element 80 is present on the clear inputs 82, 84 to the driving amplifiers 68, 70 operate in the manner described above. When the output signal of the sweep element 80 does not occur, however, the switching elements 58, 62, 56, 60 remain non-conducting in the driving amplifiers 68,70 regardless of their input signal.

The above-described current supply of the motor 18 from the rectifier part 14 also has the advantage over the use of conventional split-pole motors fed by line voltage that the same type of motor can always be used as the motor 18 regardless of the line voltage valve. In countries with different line voltages, the image reproducing apparatus would otherwise have to be equipped with motors of different voltage, and with frequencies deviating greatly from the usual line frequencies, for example in aircraft, this frequency would have to be allowed for in choosing the type of motor.

I claim:
1. In an image reproducing apparatus comprising:
   a picture tube (10) within a housing;
   a control circuit (16) controlling the beam deflection of said picture tube and generating an image synchronization signal (BSN) having a predetermined image producing frequency which is preferably almost equal to a mains frequency;
   and a ventilator (20) arranged within said housing and driven by an electrical motor (18);
   the improvement consisting in that the motor (18) is a rotating-field motor;
   and that the rotating field of said motor is generated constantly and sybchronously to the image synchronization signal (BSN) and in dependency on the latter.
2. Picture receiver as claimed in claim 1, characterized in that the motor (18) is an asynchronous motor.
3. Image producing apparatus as claimed in claim 2, characterized in that the motor (18) is a phase-shifting asynchronous motor in which at least one field coil terminal (26) is connected with a single other field coil terminal (22) by way of an impedance which causes the phase shift, preferably a capacitor (34).
4. Image reproducing apparatus as claimed in claim 1, characterized in that the motor (18) is an external-rotor motor.
5. Image reproducing apparatus as claimed in claim 1 wherein said motor (18) has at least two field coils (28,30), the combination further including a direct-current source (14) connected to feed pulses to said coils.
6. Image reproducing apparatus as claimed in claim 5, characterized in that the direct current source is a rectifier (14) fed by the line current.
7. Image reproducing apparatus as claimed in claim 1, characterized in that the motor (18) includes three field coils (28,30,32).

8. Image reproducing apparatus as claimed in claim 7, characterized in that the field coils (28,30,32) of the motor (18) are connected in a star circuit between its field coil terminals (22,24,26).

9. Image reproducing apparatus as claimed in claim 7, characterized in that at least one pulse generator (42) is provided to which the image synchronizing signal (BSN) is applied and which generator, when an image synchronizing pulse occurs in the image synchronizing pulse generates a second delayed control pulse, and in that the current supply to two field coil terminals (22,24) takes place as a function of the first or second control pulse.

10. Image reproducing apparatus as claimed in claim 9, characterized in that the first and second control pulses each show a pulse duration equal to half of the sequence duration of the image synchronizing pulse and that the second control pulse follows immediately after the first control pulse in time.

11. Image reproducing apparatus as claimed in claim 9, characterized in that for generating the control pulse a single pulse generator (42) with two nonequivalent outputs (44, 46) is provided which generator generates the first control pulse in the output signal of the one output (44) and the second control pulse in the output signal of the second output (46).

12. Image reproducing apparatus as claimed in claim 9, characterized in that the pulse generator (42) is a monostable sweep element.

13. Image reproducing apparatus as claimed in claim 3, characterized in that two field coil terminals (22,24) of the motor (18) are each connected to one bridge terminal (64,66) of a bridge (50) fed by the dc voltage source (14), in each of the four bridge arms of which bridge is inserted one switching element (56,58,60,62), and in that the respective two switching elements (56,58,60,62) which are connected in series with the dc voltage source (14) are controlled as a function of one of switching elements (56,62) is conducting when the other pair of switching elements (58,60) is non-conducting and vice-versa.

14. Image reproducing apparatus as claimed in claim 13, characterized in that the two respective switching elements (56, 58; 60, 62) which are connected in series with the dc voltage source (14) are formed by a driving amplifier (68, 70) the control input of which is acted on by a control pulse and the output of which, formed by a bridge terminal (64, 66), is connected to a field coil terminal (22, 24) of the motor (18).

15. Image reproducing apparatus as claimed in claims 14, characterized in that, connected in parallel to each switching element (56, 58, 60, 62), there is a diode (72, 74, 76, 78) reverse-biased with respect to the dc voltage of the dc voltage source (14).

16. Image reproducing apparatus as claimed in claim 1 including means for switching off the power supply to the field coil terminals (22,24) of the motor (18) as a function of the nonoccurrence of any image synchronizing pulse in the image synchronizing signal (BSN) during a prescribed period exceeding the sequence duration of the image synchronizing pulse occurring in this signal in undisturbed operation.

17. Image reproducing apparatus as claimed in claim 16, characterized in that the image synchronizing signal (BSN) acts on a monostable sweep element (80) retrigerably by the image synchronizing pulses of the former, the power supply being interrupted when this element's output signal ceases.

18. Image reproducing apparatus as claimed in claim 17, characterized in that the driving amplifiers (68,70) each show a clear input (82, 84) to which the output signal of the sweep element (80) is applied and upon the cessation of the output signal of the sweep element (80) at the clear input they clear their output (64, 66) of the two supply voltage terminals (52, 54).

* * * * *